United States Patent [19]

Blahut et al.

[11] 3,819,877

[45] June 25, 1974

[54] CENTRALIZED NETWORK FOR A TELEPHONE STATION SYSTEM

[75] Inventors: Donald Edgar Blahut, Bloomfield, N.J.; Stanley Joel Friedman, Indianapolis, Ind.; Donald Henry Nash, Colts Neck, N.J.

[73] Assignee: Bell Telephone Laboratories, Incorporated, Murray Hill, N.J.

[22] Filed: Dec. 10, 1971

[21] Appl. No.: 206,692

[52] U.S. Cl. ..... 179/170 R, 179/170 NC, 179/1 CN

[51] Int. Cl. ..... H04b 3/36

[58] Field of Search .... 179/99, 18 AD, 16 F, 170 T, 179/170 G, 170 R, 170 D, 170 NC, 81 R, 84 R, 170 J, 170.8, 2.5 R, 1 CN, 1 HF, 1 VC, 18 BC

[56] References Cited

UNITED STATES PATENTS

| | | | |
|---|---|---|---|
| 2,721,897 | 10/1955 | Schneckloth | 179/2.5 R |
| 2,812,388 | 11/1957 | Thomas | 179/170 D |
| 3,059,121 | 10/1962 | Masters et al. | 179/170 J |
| 3,083,265 | 3/1963 | Paulaitis | 179/1 CN |
| 3,231,687 | 1/1966 | Riesz | 179/1 VC |
| 3,483,335 | 12/1969 | Piotrowski | 179/170.8 |
| 3,524,929 | 8/1970 | Burns | 179/1 CN |

FOREIGN PATENTS OR APPLICATIONS

| | | | |
|---|---|---|---|
| 1,243,043 | 9/1959 | France | 179/81 R |

*Primary Examiner*—Kathleen H. Claffy
*Assistant Examiner*—Alan Faber
*Attorney, Agent, or Firm*—E. J. Olinder; J. J. Torrente

[57] ABSTRACT

In a telephone station system the telephone apparatus is divided into two portions, a centralized network and one or more extensions or sets. The network is connected between the telephone sets and the line and may include, for example, a hybrid, amplifiers, automatic gain control circuitry and lightning protectors — all of which are shared by the satellite sets. The sets preferably include only the minimum required components such as a transmitter, a receiver, associated amplifiers, a tone ringer sounder and driver, and a dial.

10 Claims, 13 Drawing Figures

CENTRALIZED NETWORK FOR A TELEPHONE STATION SYSTEM

BACKGROUND OF THE INVENTION

1. Field of the Invention

This invention relates to station telephone equipment and more particularly to station telephone systems employing a plurality of extension sets.

2. Description of the Prior Art

The continued growth in the average number of residence telephone sets per line, approaching approachine 1.5, although welcomed by the telephone industry, is proving to be a cause of concern for reasons both economic and operational. As the number of sets grows, total capital investment expands at an even faster rate as the result of the trend toward premium cost "decorator" sets and toward sets that incorporate all of the newest telephone features. The extra cost of such sets arises in part from the complexities of packing the set components into relatively small volumes. Moreover, multiple station installations tend to employ a relatively high percentage of these more expensive sets. The resulting economic problem of disproportionate capital investment in station apparatus has been made still more acute by rising labor costs for both manufacture and repair and by an alarming increase in station set losses.

There are a number of different facets to the operational problems involved in multiple set station systems. One problem is that the performance of a telephone connection is degraded as additional stations go off-hook. A further problem concerns the compromise that must be accepted in the transmission characteristics of conventional sets. This compromise stems from the fact that a single station set network design must operate in a number of different electrical environments, including PBX's, normal length loops and long loops. Still another difficulty arises from the complexities encountered in the interconnection of customer provided station units. Currently, special purpose couplers are employed to effect such connections and these result in an extra cost to the customer. Finally, under conventional practice, evolution in the design and engineering of both telephone switching networks and station connecting loops is constrained because of the large investment in conventional station sets of various types that are only compatible, however, with very limited changes in the electrical environment in which they are operated.

SUMMARY OF THE INVENTION

The foregoing economic and operational problems are met or substantially mitigated in accordance with the principles of the invention by radically reducing the functions and the corresponding structural and circuit elements that are normally considered to be an integral part of every conventional telephone set. This reduction is achieved through the concept of dividing normally integral telephone units into two portions, one being termed the centralized network, or simply the network, and the other being termed the extension, the satellite set or simply the set. In accordance with the invention, the network is typically located at the point where the loop enters the customer's premises and includes those elements and functions which are shared by all of the sets. Since it is the network rather than the sets that interfaces with the telephone line, the network is designed to provide those functions that are dependent on the central office and loop characteristics. These functions include line impedance termination, line loss equalization, ringing signal detection and off-hook signal generation. The sets, on the other hand, provide the interface with the customer and thus typically include only the bare minimum of essential components such as a transmitter, a receiver, a ringer, a dial and a switchhook.

In accordance with an important feature of the invention the centralized network includes circuitry that ensures the presentation of a constant impedance to the line irrespective of the number of sets that are off-hook at any particular instant. Thus, return loss to the line is independent of the number of sets off-hook. Moreover, bridged party contrast, the difference in receiver volume between that received from an extension set transmitter and a distant party transmitter, is virtually eliminated.

DETAILED DESCRIPTION

Figure 7:
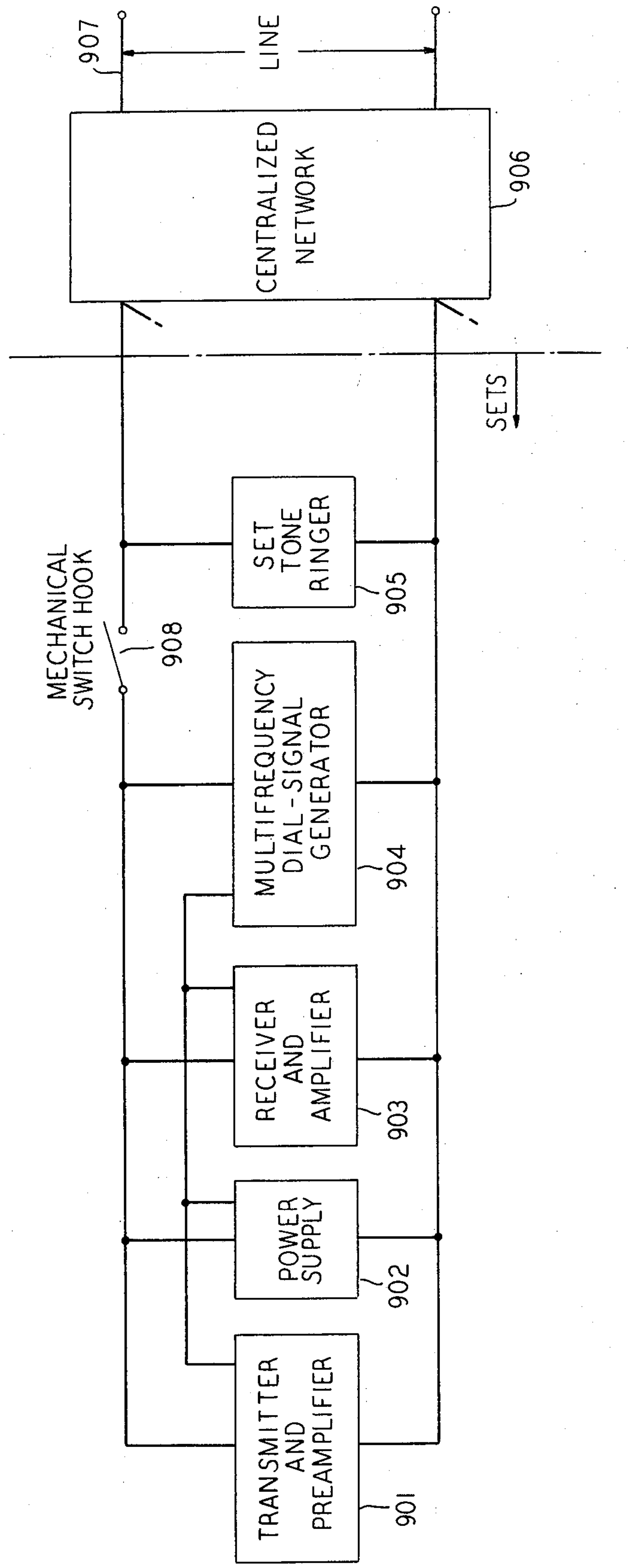
FIG. 7 is a block diagram of a system in accordance with the invention.

In the simplified block diagram of a system in accordance with the invention shown in FIG. 7, a common centralized network 906 is shown connected between a telephone line 907 and a plurality of sets, only one of which is shown in block detail. The set includes a transmitter and its associated preamplifier 901, a power supply 902, a receiver and its associated amplifier or preamplifier 903, a multifrequency dial signal generator 904 and a set tone ringer 905. In the typical installation, the centralized network is located in close proximity to the point at which the telephone line or local loop 907 enters the station premises while each of the sets is located at a convenient respective point at the station relatively remote from the network 906.

Figure 1A:
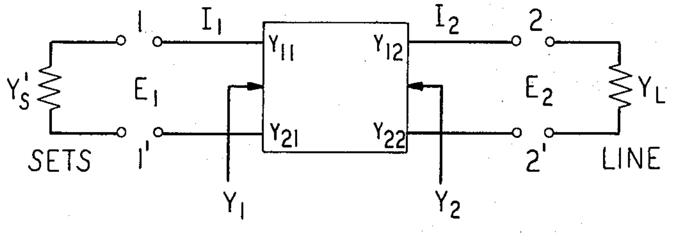
FIGS. 1A and 1B are schematic network diagrams illustrating the network theory involved in a system in accordance with the invention.

An examination of the network theory underlying a system design in accordance with the invention will serve as a useful preface to a detailed consideration of the individual circuit units that make up the centralized network. Consider first the a.c. model represented by the y-parameters as shown in FIG. 1A, where $Y_L$ is the a.c. line admittance and $Y'_S$ is the admittance of the off-hook telephone sets.

Figure 1B:
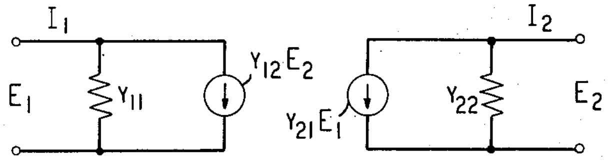

The y-parameter network can also be drawn as shown in FIG. 1B. The network y-parameter equations can then be written as follows:

$$I_1 = y_{11}E_1 + y_{12}E_2, \quad (1)$$

$$I_2 = y_{21}E_1 + y_{22}E_2. \quad (2)$$

Since $I_2 = -E_2Y_L$, the transmit gain $T = (E_2/E_1)|Y_L$ can be found from equation (2) to be $$T = -(Y_{21}/y_{22} + Y_L), \quad (3)$$

and the admittance of the network from the set side $Y_1 = (I_1/E_1)|Y_L$ can be found from equations (1) and (2) to be $$Y_1 = y_{11} - (y_{12}y_{21}/y_{22} + Y_L). \quad (4)$$

Similarly, with $I_1 = -Y'_SE_1$, the receive gain (R) and the network admittance seen from the line ($Y_2$) are found to be:

$$R = (E_1/E_2)|Y'_S = (-y_{12}/Y_{11} + Y'_S), \quad (5)$$

$$Y_2 = (I_2/E_2)|Y'_S = y_{22} - [Y_{12}y_{21}/y_{11} + Y_S]. \quad (6)$$

These equations can be solved for the y-parameters with the following results:

$$y_{11} = (Y_1 + Y'_STR)/(1 - TR);$$
$$y_{22} = Y_2 = Y_LTR/(1 - TR);$$
$$Y_{12} = -R(Y_1 + Y'_S)/(1 - TR);$$
$$y_{21} = -T(Y_2 + Y_L)/(1 - TR). \quad (7)$$

From design considerations, it is desirable to have $Y_1$ and $Y'_S$ constant. T, R, and $Y_2$ are dictated by telephone system considerations with $Y_2$ being constant and T and R varying with loop length and frequency for equalization. $Y_L$ is assumed to be constant. Since $Y'_S$ represents the sets off-hook, this quantity will vary. However, if the network simulates the sets that are on-hook or not connected to the network, then the admittance across the terminals as seen by the network will be constant and equal to $NY_S$ where $Y_S$ is the admittance of one set, and N is the maximum number of sets a network can serve. From equations (7) it can be seen that the network can be more easily realized with the above restraints by making the TR product constant. As a result, $y_{11}$ and $y_{22}$ are constant, and $y_{12}$ and $y_{21}$ are proportional to R and T, respectively. To avoid a stability problem, the TR product is made negative.

Figure 2A:
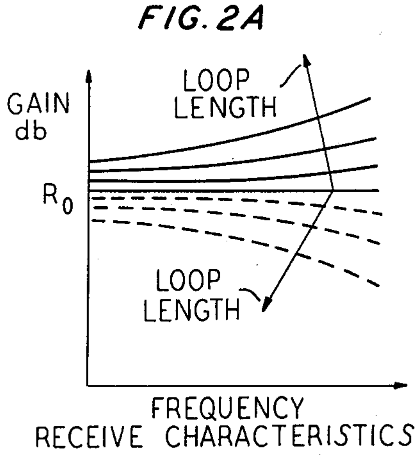
FIGS. 2A and 2B are frequency versus gain plots illustrating the receive and transmit characteristics of a system in accordance with the invention.
Figure 2B:
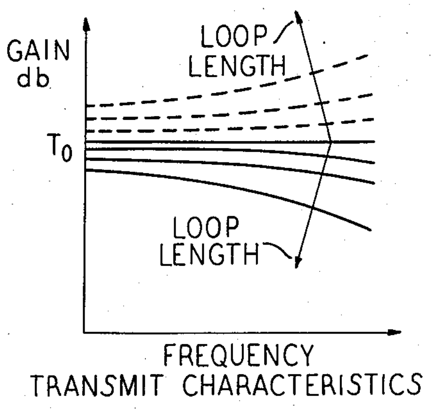

To keep the TR product a constant and independent of loop length requires voice switching. This requirement stems from the fact that T and R must increase simultaneously with loop length for equalization but must be inverse functions to keep the TR product constant. The transmit and receive equalization characteristics are as shown in FIGS. 2A and 2B. If T and R are given by $$T = -f(s, 1)T_O, \quad (8)$$

$$R = +[f(s, 1)]^{-1}R_0 \quad (9)$$

in the transmit mode, and $$T = -[g(s, 1)]^{-1}T_0, \quad (10)$$

$$R = +g(s, 1)R_0 \quad (11)$$

in the receive mode, where $T_0$ and $R_0$ are the zero loop transmit and receive gain, respectively, $s$ is frequency and 1 is loop length, then equations (7) become $$y_{11} = K_{11},$$
$$y_{22} = K_{22},$$
$$y_{12} = -K_{12}[f(s, 1)]^{-1}$$
$$\text{or } -K_{12}\, g(s, 1),$$
$$y_{21} = f(s, 1)K_{21}$$
$$\text{or } [g(s, 1)]^{-1}K_{21}, \quad (12)$$

where the K's are all constants.

Figure 3:
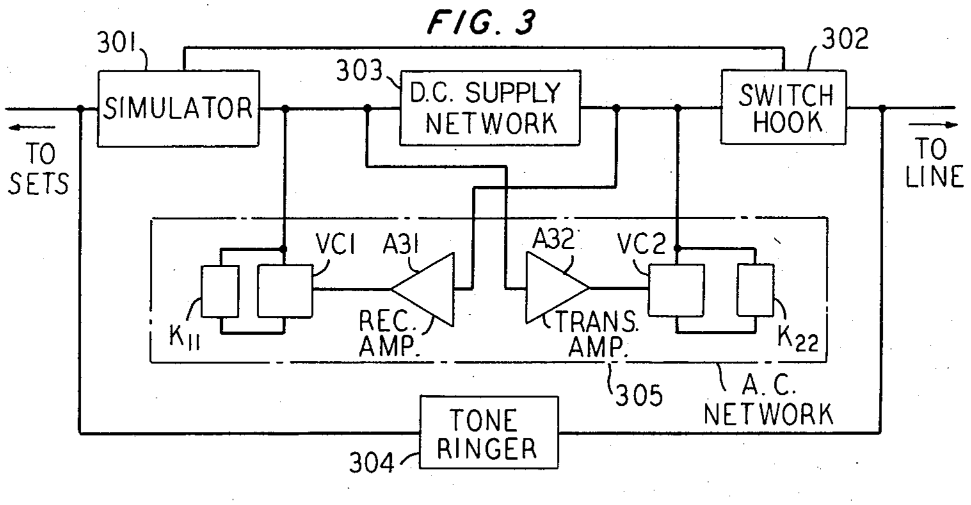
FIG. 3 is a block diagram of the network portion of the system in accordance with the invention.
Figure 4A:
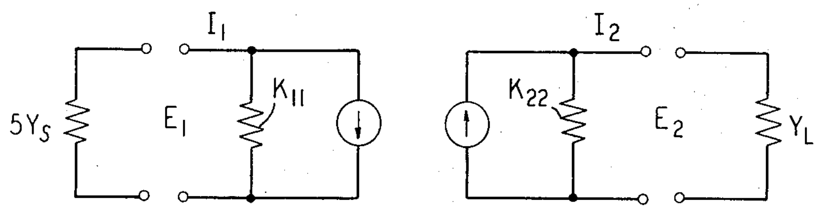
FIG. 4A is a schematic network diagram illustrating the network theory involved in a system in accordance with the invention.
Figure 4B:
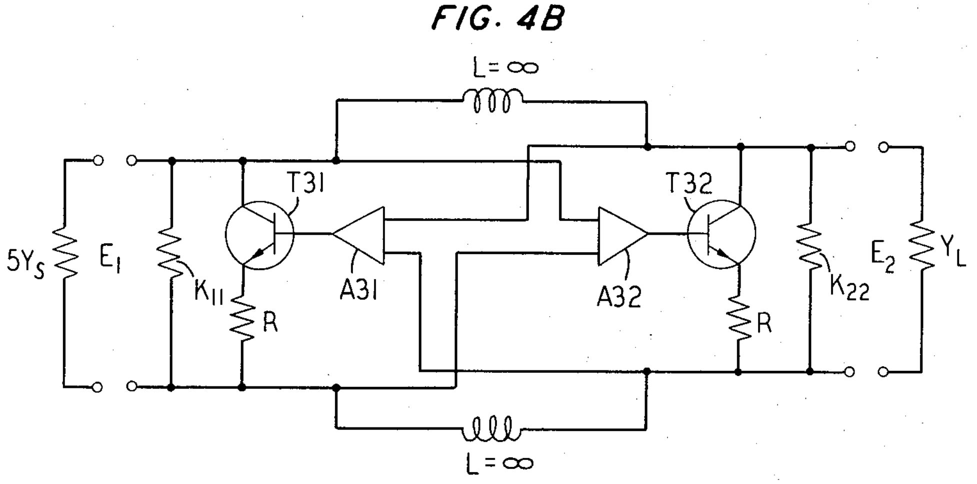
FIG. 4B is a simplified schematic circuit diagram, partially in block form, of the network portion of a system in accordance with the invention.

A complete block diagram of the centralized network 906 of FIG. 7 is shown in FIG. 3, where the major circuit units are shown to be a simulator circuit 301, a switchhook circuit 302, a d.c. network 303 and a tone ringer network 304, each of which will be discussed in greater detail hereinbelow. Additionally, the centralized network of FIG. 3 is shown to include an a.c. network 305, which comprises a receive amplifier A31, a transmit amplifier A32, self admittances $K_{11}$ and $K_{22}$ and voltage to current converters VC1 and VC2. From the standpoint of an a.c. circuit model, the a.c. network 305 can also be represented as shown in FIG. 4A or as in FIG. 4B. The circuit of FIG. 4B includes transistors T31 and T32 as voltage to current converters. The infinite inductors L symbolize the circuitry needed to supply d.c. power without allowing an a.c. signal from the line side to reach the set side of the network.

DESIGN PARAMETERS FOR ZERO LOOP NETWORK

To promote both clarity and simplicity, the principles of network design employed in a system in accordance with the invention may best be discussed in terms of a developmental model operating on zero loop without equalization or voice switching. Calculation of the parameters for the zero loop system are based on a desired transmit level of −20 dB V into the central office and a receive level of −22 dB V from the central office. It is also assumed that speech levels for both transmit and receive at a set are at −40 dB V. The transmit and receive gains may then be expressed as follows:

$$T_0 = 10 \text{ (or 20 dB)}$$
$$R_0 = 0.126 \text{ (or −18 dB)} \qquad (13)$$

Figure 4C:
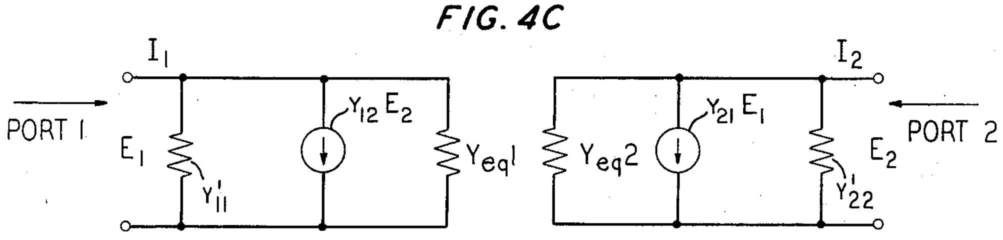
FIG. 4C is a schematic network diagram illustrating the network theory involved in a system in accordance with the invention.

In order to calculate the y-parameters of the a.c. network, it is necessary to include the effects of the circuitry simulating the infinite inductors. If it is assumed that this network has a.c. admittance $Y_{eq1}$ and $Y_{eq2}$ from ports 1 and 2, respectively, then the a.c. circuit of the network can be represented as shown in FIG. 4C where $$y_{11} = y_{11'} + Y_{eq1};$$
$$y_{22} = y_{22'} + Y_{eq2},$$
$$y_{11'} = y_{11} - Y_{eq1};$$
$$y_{22'} = y_{22} - Y_{eq2}. \qquad (14)$$

With further translation it can be shown that the design parameters for the zero loop system are:

$$Y_{eq2} = Y_2;$$
$$Y_1 = 5Y_ST_0R_0 + (Y_{eq1}/W);$$
$$Y_{11'} = O;$$
$$y_{12} = R_0(5Y_S + Y_{eq1}) = R_0(5Y_S + Y_1)/(1 + T_0R_0);$$
$$y_{22'} = -T_0R_0(Y_2 + Y_L)/(1 + T_0R_0) = R_0y_{21};$$
$$y_{21} = +T_0(Y_2 + Y_L)/(1 + T_0R_0). \qquad (15)$$

To arrive at illustrative magnitudes for each of these parameters, the following values are assigned either from system constraints or optional design choice:

$$T_0 = +10;$$
$$R_0 = 0.126;$$
$$Y_{eq1} = 1/4000;$$
$$Y_L = 1/Z_L = 1/900;$$
$$T_0R_0 = 1.26;$$
$$1 + T_0R_0 = 2.26;$$
$$Y_2 = 1/Z_2 = 1/750;$$
$$Y_S = 1/Z_S = 1/20{,}000. \qquad (16)$$

Parameter magnitudes then become:

$$Y_{eq2} = 1/750;$$
$$Y_1 = 8.80 \times 10^{-4};$$
$$y_{11'} = 0;$$
$$y_{11} = -2.876 \times 10^{-5};$$
$$y_{12} = -6.3 \times 10^{-5};$$
$$y_{21} = +1.082 \times 10^{-2};$$

$$y_{22'} = -1.362 \times 10^{-3};$$
$$y_{22} = -2.950 \times 10^{-5}. \qquad (17)$$

D.C. SUPPLY NETWORK

Figure 5A:
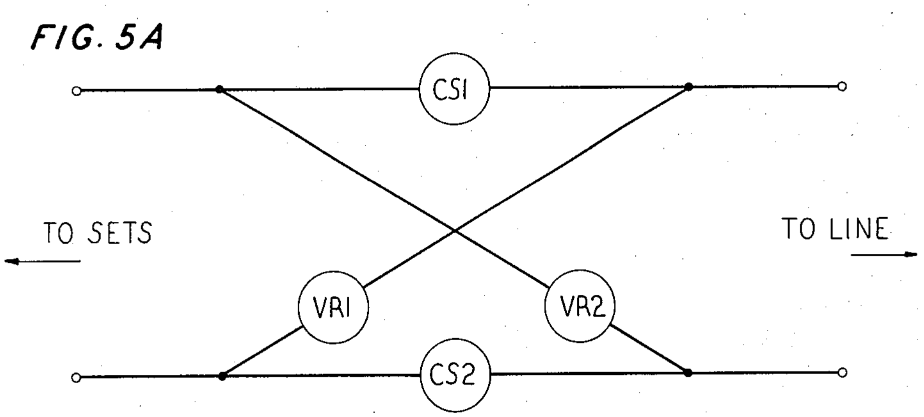
FIG. 5A is a block diagram of the d.c. supply network of a system in accordance with the invention.
Figure 5B:
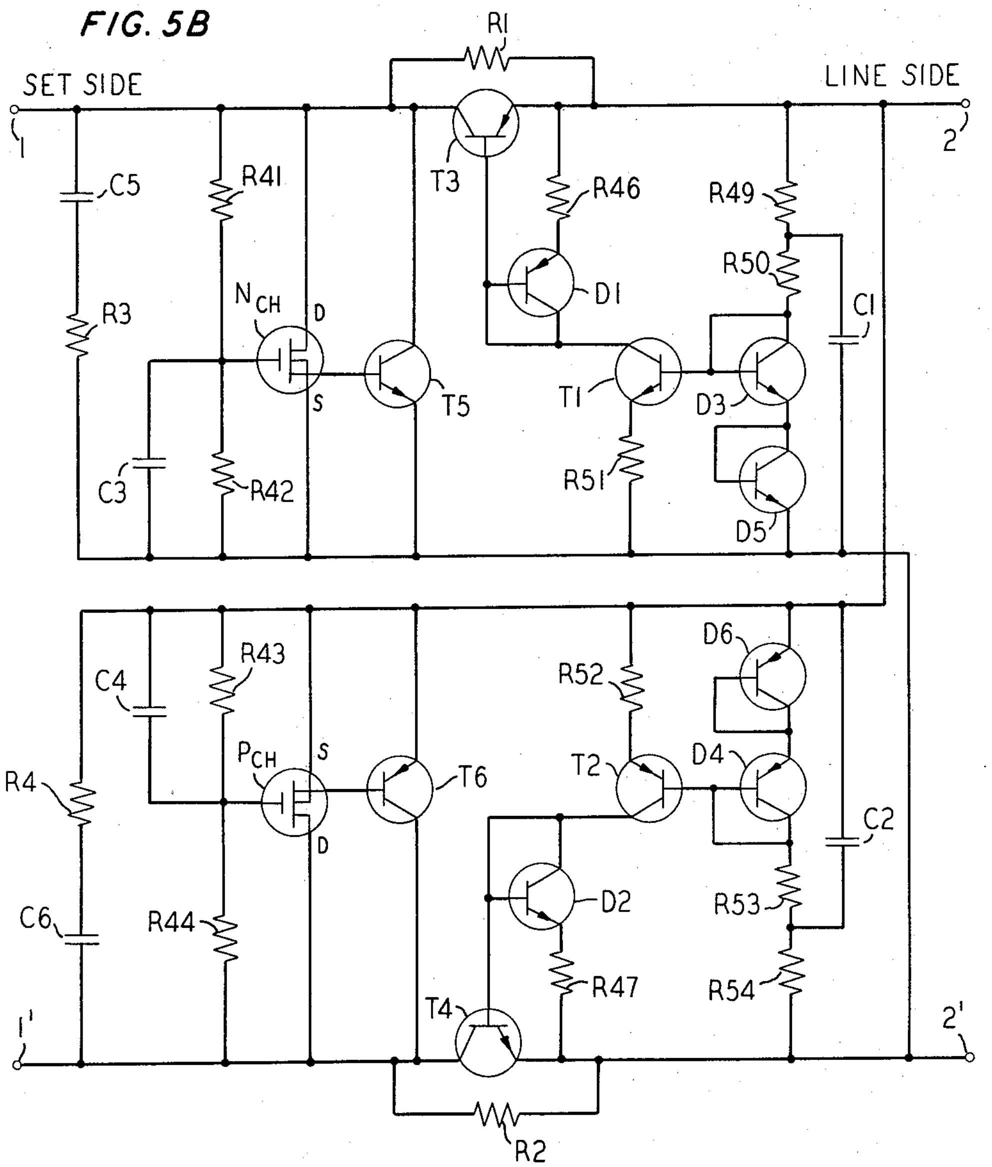
FIG. 5B is a schematic circuit diagram of the network shown in block form in FIG. 5A.

The d.c. supply network 303, shown in block form in FIG. 3, includes two voltage regulators VR1 and VR2 diagonally connected across two current sources CS1 and CS2 as shown in FIG. 5A. The purpose of the regulators is to keep the voltage across the current sources the same so that one current source transistor does not saturate and unbalance the network. Circuit details of the d.c. network of FIG. 5A are shown in FIG. 5B. The voltage regulator in FIG. 5B corresponding to VR1 in FIG. 5A includes capacitors C4 and C6, resistors R4, R43 and R44, a P channel IGFET $P_{ch}$ and a bipolar transistor T6. Similarly, the voltage regulator in FIG. 5B corresponding to VR2 in FIG. 5A includes capacitors C3 and C5, resistors R3, R41 and R42, an N channel IGFET $N_{ch}$ and a bipolar transistor T5.

The current source in FIG. 5B corresponding to CS1 in FIG. 5A employs transistors T1 and T3, diodes D1, D3 and D5, a capacitor C1 and resistors R1, R46, R49, R50 and R51. Similarly, the current source in FIG. 5B corresponding to CS2 in FIG. 5A employs transistors T2 and T4, diodes D2, D4 and D6, a capacitor C2 and resistors R2, R47, R52, R53 and R54.

In the current sources shown in FIG. 5B, transistors T3 and T4 may not have equal collector to emitter impedances ($r_c$) and, accordingly, resistors R1 and R2 are selected to be equal in magnitude but much smaller than $r_c$ in order to ensure a.c. balance. It is significant that when all of the biasing resistors are taken into account, all arms of the lattice have approximately equal a.c. resistances; and, in the passband, the network is equivalent to an a.c. balanced bridge in parallel with current sources.

RECEIVE AMPLIFIER

As pointed out above, the receive amplifier A31 and the transmit amplifier A32 of FIG. 3 are a part of the a.c. network 305. Both of these amplifiers are preferably of the operational type and may be substantially conventional. It is known that the receive amplifier with an accompanying voltage to current converter gives the parameter $y_{12}$, acting as a voltage controlled current source. As shown in both FIGS. 3 and 4B, the a.c. drive is taken from the line side of the d.c. network.

TRANSMIT AMPLIFIER

The transmit amplifier A32 with a voltage to current converter VC2 realizes the zero loop $y_{21}$ parameter. This amplifier may advantageously employ two stages so that the second stage may be jointly used for the $y_{22}$ parameter. From equation (7) it can be seen that both $y_{21}$ and $y_{22'}$ depend on $Y_L$. In the case of networks used for telephone cables a distributed RC network will be used to approximate this admittance, and it is desirable to use only one such network. This network can be put in the second stage of the A32 amplifier and can thus be used in forming $y_{21}$ and $y_{22'}$. The parameter $y_{22}$ is produced in the second stage by routing the line signal by way of capacitors (not shown) and driving the line through a transistor drive stage (not shown).

ELECTRONIC SWITCHHOOK AND SIMULATOR CIRCUIT

Figure 6:
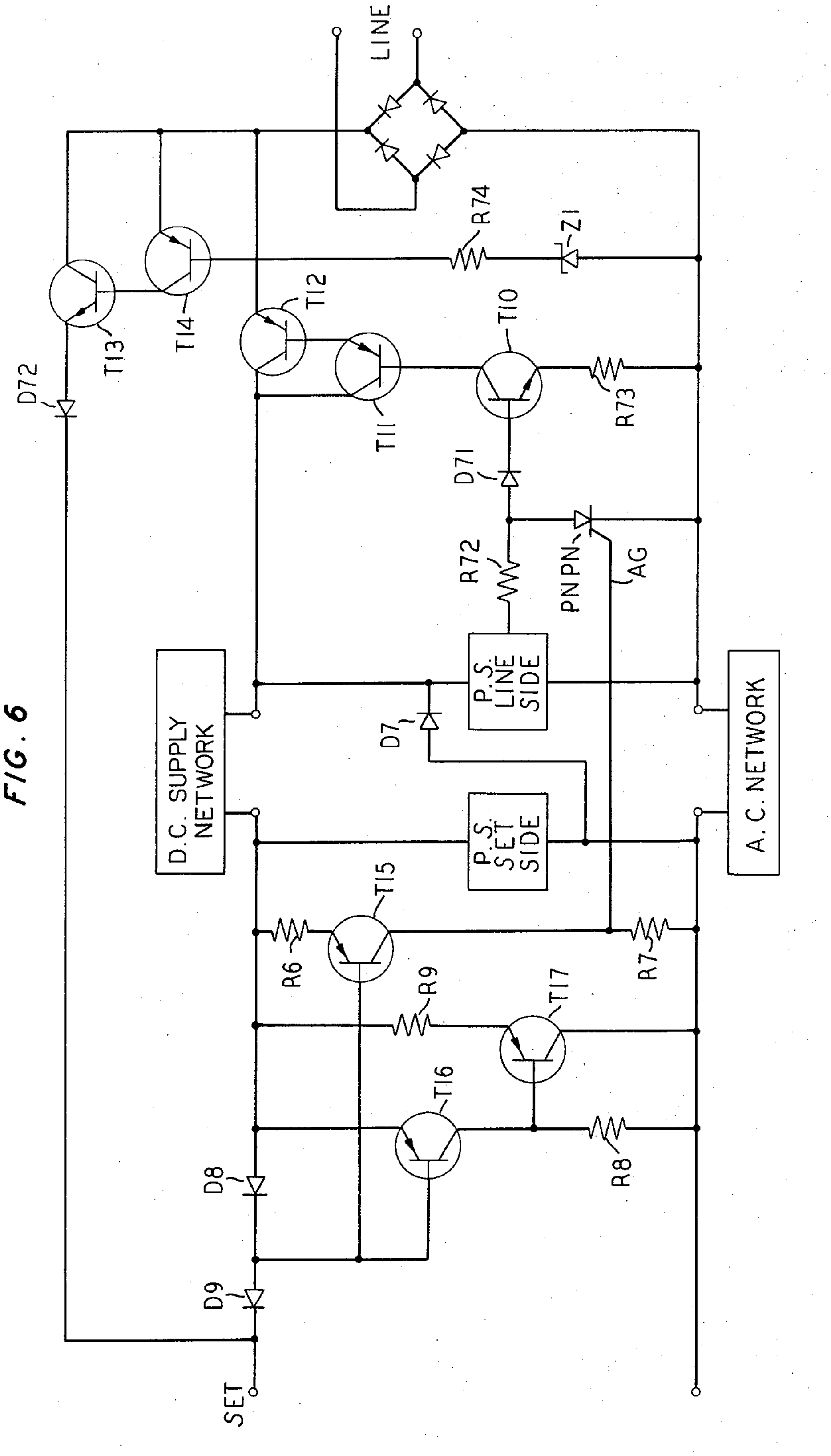
FIG. 6 is a schematic circuit diagram of the switchhook and simulator circuits shown in block form in FIG. 3.

The electronic switchhook and simulator circuit shown in FIG. 6 forms an additional portion of the centralized network 906 shown in FIG. 7. The basic switchhook circuit employs transistors T10, T11 and T12. Once the set is turned on the power supply P.S., line side, keeps transistor T10 on which drives the Darlington pair transistors T11 and T12 into saturation.

To turn on the electronic switchhook network, the set is taken off the mechanical switchhook 908 of FIG. 7, closing a turn-on current path through transistors T13, T14, diode D72, the set, diode D7 and the power supply P.S., line side. The power supply then turns on, at the same time turning on the Darlington pair transistors T11 and T12 which turns on the full network. When the centralized network turns on, this turn-on path becomes inoperative and does not affect the circuit operation because the voltage has dropped below the threshold necessary to sustain operation.

When the centralized network is on, the anode gate AG of the PNPN device is kept positive. When all sets are hung up, the current through transistor T15 becomes zero, the gate voltage drops and the PNPN shorts the base of transistor T10, thus opening the electronic switchhook which hangs up the network. Diode D9 is included to prevent the network from turning on by way of transistors T13 and T14 when the set has not been taken off-hook. Resistors R6, R7, R72, R73 and R74 perform conventional biasing functions an zener diode Z1 is a part of the turn-on circuit for transistor T14. Diode D72 prevents the establishment of an a.c. path between the set and the line by way of the transistors T13 and T14.

The purpose of the simulator circuit portion of FIG. 6 is to maintain the load seen by the a.c. network and d.c. supply network at a constant value equivalent to N sets whenever the centralized network is off-hook. The need for providing a constant a.c. impedance $Y'_S$ has been described above. The constant d.c. drain keeps the d.c. supply network in balance. The simulator circuit includes transistors T16 and T17, resistors R8 and R9 and a diode D8. The current from the network 906 to the sets is proportional to the number of sets, N. This current passes through diode D8. By using junction area ratios, the collector current of transistor T16 is held to a fraction of the current through diode D8 and this is proportional to the number of sets. The collector current of transistor T16 generates a voltage across R8 and the emitter current of transistor T17 decreases as this voltage increases. It can be shown that by adjusting the R8/R9 resistance ratio, the total current out of the set side of the a.c. network and d.c. supply network can be made independent of the number of sets off-hook.

TONE RINGER

The network tone ringer 304 of FIG. 3 is shown in block form only inasmuch as it may take any one of a variety of forms, all representing substantially conventional approaches. Some form of ringing signal detector is, of course, a basic requirement. In one illustrative embodiment of the invention, the detector was used to modulate the d.c. voltage by switching suitably connected transistors between cutoff and saturation. The modulated d.c. output is then fed conventionally to the set tone ringer 905 or other conventional ringing transducer at the sets.

EQUALIZATION AND VOICE SWITCHING

As indicated above, in the interests of clarity and simplicity, some of the network theory underlying the principles of the invention was discussed in terms of a zero loop system to avoid the complexities of network analysis that would necessarily be introduced by including the concepts of equalization and voice switching. The underlying principles of the invention as discussed, however, are valid whether or not equalization and voice switching are used.

Figure 8:
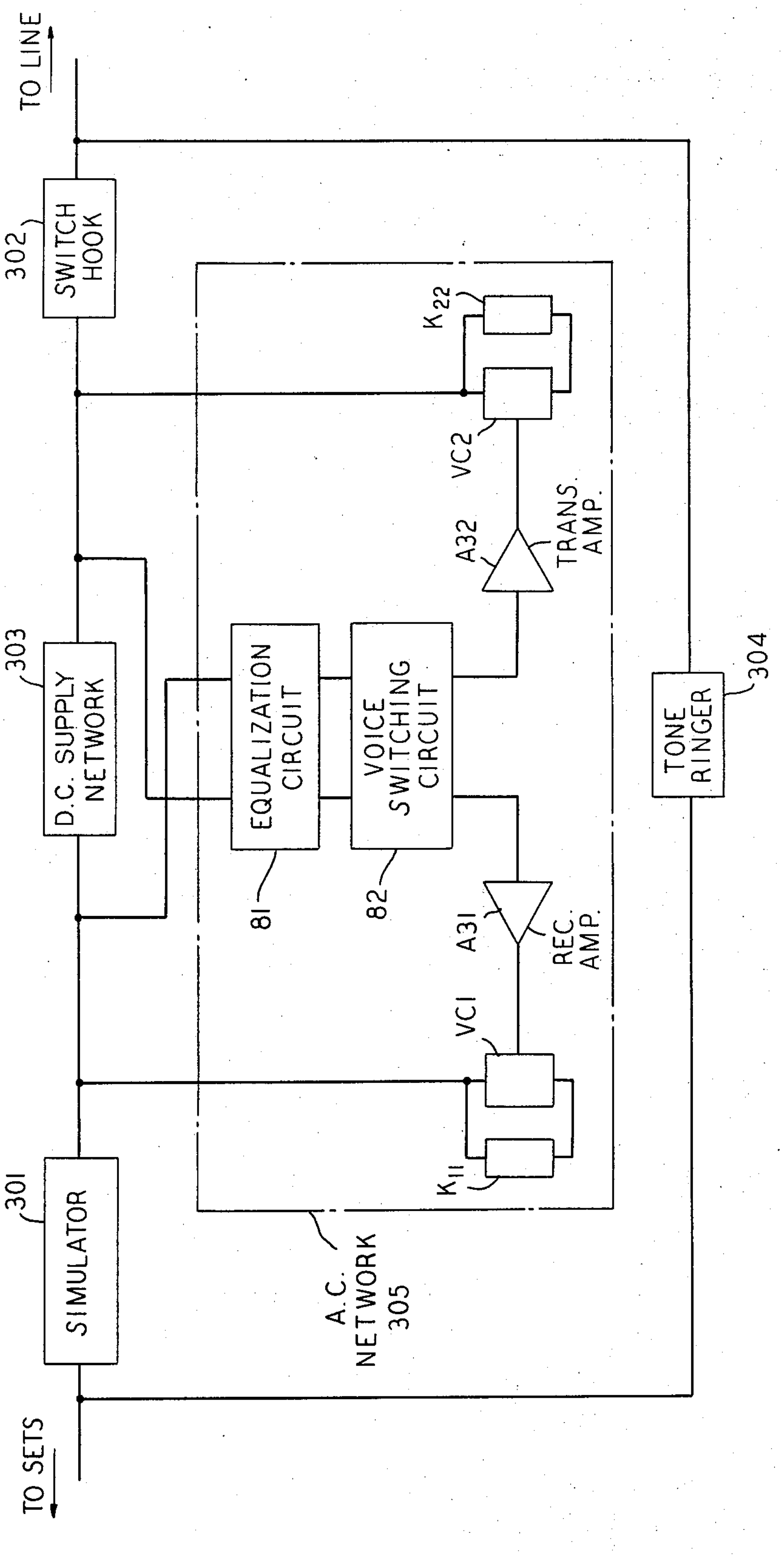
FIG. 8 is a block diagram of the centralized network of FIG. 3 modified to include equalization and voice switching circuits.

The centralized network of FIG. 3 is modified in FIG. 8 to include an equalization circuit 81 and a voice switching circuit 82 which are incorporated within the a.c. network portion of the centralized network. The need for an equalization circuit to accommodate any wire system to a variety of loop lengths is apparent and well known in the art of telephony. Any one of a variety of these known equalization arrangements may be employed satisfactorily in a system in accordance with the invention. The need for voice switching when equalization is employed is evident when the nature of the a.c. network 305 is fully understood. First, it is obvious that no hybrid circuits are employed, which of course represents a departure from conventional telephony. Instead, the two amplifiers A31 and A32 and the manner in which they are interconnected in the system provide the equivalent of a two-wire to two-wire bidirectional repeater. As pointed out above, a necessary condition for a system in accordance with the invention is that the product of the transmission and receive gains TR remains constant. With equalization alone on nonzero loops it is clear that TR cannot remain constant and that as a result, the system would quickly become unstable. With voice switching used in combination with equalization, however, all impedances can in effect remain at the same level and the TR product does in fact remain constant. Voice switching techniques are well known in the telephone art, one example being in loud speaking telephones. Virtually identical voice switching can be employed to implement the voice switching function implied by the circuit block 82.

It is to be understood that the embodiment as disclosed herein is merely illustrative of the principles of the invention and that various modifications thereto may be effected by persons skilled in the art without departing from the spirit or scope of the invention.

What is claimed is:

1. A telephone station system comprising, in combination, a plurality of telephone sets, a centralized network, said network bein being between said sets and a telephone line, said network including an a.c. portion having a two-wire to two-wire voiceband bidirectional repeater shared by said sets with the amplification levels of said repeater selected to eliminate any need for hybrid circuits in said sets, said network including circuit means for maintaining a constant load on the set side of said a.c. portion irrespective of the number of said sets that are off-hook, each of said sets including a respective transmitter, receiver, dialing means and ringing means.

2. Apparatus in accordance with claim 1 wherein said centralized network includes means ensuring the presentation of a constant impedance to said line irrespective of the number of said sets that are off-hook at any particular instant whereby the transmit and receive characteristics of said sets are unaffected by the number of said sets placed in an off-hook mode.

3. Apparatus in accordance with claim 2 wherein said network includes electronic switchhook means responsively operative to any individual one of said sets going off-hook, thereby to effect a communication path from said line through said centralized network to any off-hook ones of said sets.

4. Apparatus in accordance with claim 1 wherein said centralized network is located at said telephone station at a position relatively remote from each of said sets.

5. Apparatus in accordance with claim 1 wherein said centralized network includes a power supply circuit powered from said line, said power supply circuit comprising first and second voltage regulator circuits connected across first and second current source circuits, respectively.

6. Apparatus in accordance with claim 1 wherein said repeater employs first and second operational amplifiers.

7. Apparatus in accordance with claim 6 including means for converting the outputs of said amplifiers from voltage sources to current sources.

8. Apparatus in accordance with claim 6 wherein said a.c. network portion of said centralized network includes an equalization circuit.

9. Apparatus in accordance with claim 6 wherein said a.c. network portion of said centralized network includes a voice switching circuit.

10. Apparatus in accordance with claim 1 wherein said centralized network includes a ringing detector circuit and translating means for driving each of said ringing means in said sets.

* * * * *